Aug. 30, 1927.  
W. W. COBLENTZ  
1,640,393  
OPTICAL MEANS FOR GENERATING, AMPLIFYING, AND CONTROLLING ELECTRIC CURRENTS  
Filed Sept. 18, 1923

INVENTOR  
William W. Coblentz  
BY Robert H. Young  
ATTORNEY

Patented Aug. 30, 1927.

1,640,393

UNITED STATES PATENT OFFICE.

WILLIAM W. COBLENTZ, OF WASHINGTON, DISTRICT OF COLUMBIA.

OPTICAL MEANS FOR GENERATING, AMPLIFYING, AND CONTROLLING ELECTRIC CURRENTS.

Application filed September 18, 1923. Serial No. 663,411.

The present invention relates to the production of pulsating electric currents, and has for its object to provide a new optical method for generating a pulsating unidirectional or an alternating electric current capable of use in any instance where such a current is desirable.

My invention involves a principle new in the art to which it pertains whereby the incident light rays are converted into electric current when they are projected upon a light reactive body which has the property of generating an actino-electromotive force when exposed to light.

In the course of extensive experimentation with various light reactive substances to serve as a receptor in radiophonic signaling I have discovered that some substances, for example certain samples of molybdenite and of stibnite, generate a high actinoelectromotive force, positive or negative in sign, and of a far greater magnitude than is the thermoelectromotive force obtainable from a thermocouple of pure metals similarly exposed to light.

Furthermore, I have found, when an external electromotive force is impressed upon the circuit containing this photosensitive substance, that this actinoelectromotive force is amplified or minified depending upon the direction of the polarity of the impressed electromotive force with respect to the polarity of the actinoelectromotive force which is generated within the substance.

As a result of this action when the photoactive substance is exposed to thermal radiation, especially of wave lengths in the visible spectrum, there is exhibited a considerable photoelectrical sensitivity. These phenomena I found to be due to the presence in the samples of spots or loci of actinoelectrical and photoelectrical sensitivity in close coincidence as for example, the loci of positive and negative actinoelectromotive force being approximately .1 to 3 mm apart, the spots or areas themselves being perhaps .1 to 1 mm in diameter. The action occurring seems to indicate that the actinoelectrical reaction functions like a valve to amplify or weaken the photoelectrical reaction depending upon the direction of the impressed current through the substance. As a result of this, instead of obtaining the same photoelectrical reaction, there is an outstanding difference of from two to three times between the maximum and the minimum photoelectrical effect by reversing the impressed current.

In the accompanying drawing, I have shown diagrammatically certain forms of means which may be used to secure the results hereinbefore generally described.

Figure 1:
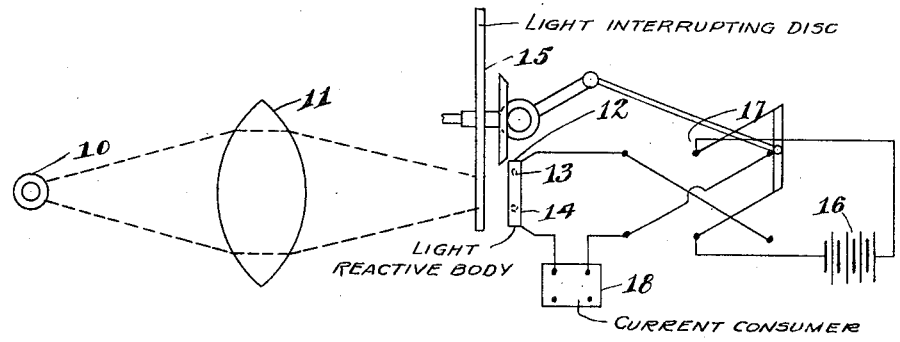
Fig. 1 is a circuit diagram showing a light reactive body and devices for controllably impressing current and for exposing the body to light.
Figure 4:
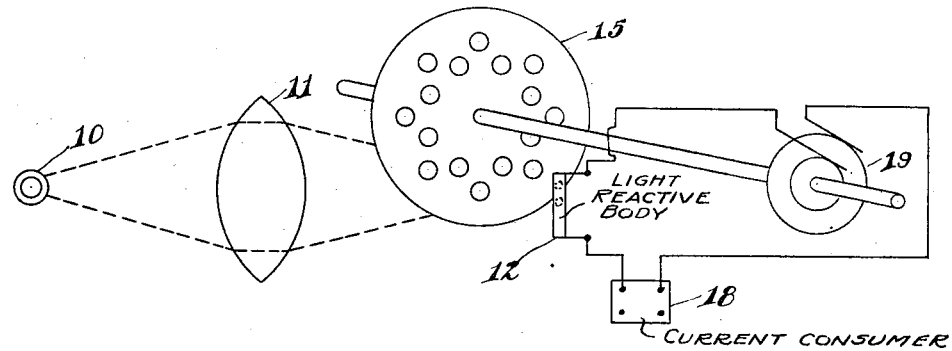
Fig. 4 is a view similar to Fig. 1 showing a modified arrangement.
Figure 2:
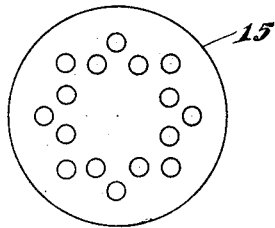
Figs. 2 and 3 are views of different forms of light interrupting discs to be used in connection with the apparatus shown in Fig. 1
Figure 3:
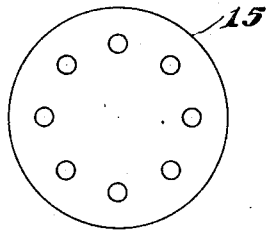

Referring to Fig. 1 of the drawing, 10 represents a source of light arranged with respect to a lens 11 to have light focused on the light reactive body 12, of molybdenite or some other substance having similar properties. The body 12 has spots or loci, represented at 13 and 14, of reactive material, one of which has maximum positive and the other maximum negative actinoelectromotive force. I have found that exposure to light of one of these spots results in the generation of an actinoelectrical current flowing in a certain direction through the substance and that exposure of the other results in a reversal in the flow of current. A light interrupting disc 15 may be provided so that either of the spots may be exposed separately. Intermittent exposure of one of the spots, as can be secured by a disc such as is shown in Fig. 3, will result in the generation of an intermittent or pulsating current flowing in one direction, the direction depending upon which spot is exposed. Alternate exposure of the spots, as can be secured by a disc such as is shown in Fig. 2, will result in the generation of an alternating current in an obvious manner.

The body 12 is shown interposed in an electric circuit supplied with a primary or impressed current by a battery 16, the direction of flow being reversible by a double throw switch 17 operable simultaneous with the light exposures in any suitable manner as indicated diagrammatically. The device shown at 18 is merely an outlet to an apparatus to be operated by the current flowing in the circuit, and may be a detecting instrument as a telephone receiver or a galvanometer. When the spots are exposed with an impressed current flowing through the body 12, the maximum positive or negative photoelectric current is secured superimposed upon or amplifying the actinoelectric current when the impressed current is made to pass through the body in the same direction that the actinoelectric current flows. It is apparent that by using a rotating disc such as that shown in Fig. 2, an alternating current of maximum positive and maximum negative effect can be secured provided the switch 17 is reversed simultaneously as the spots are alternately exposed. Similarly a pulsating current flowing in one direction and of maximum negative or positive effect can be secured with the use of a disc such as that shown in Fig. 3, provided the switch 17 is disconnected from its operating connections and set to impress a current flowing in the same direction as the actinoelectric current generated by the exposure of the spot on the body.

It is apparent that the intermittent or alternate selective exposure of the spots 13 and 14 may be secured in other ways than by the use of a rotating interrupting disc. The disc shown is merely one of many possible practical structures. Likewise, it is apparent that the switch 17 may be replaced by an alternator such as the generator 19 if the latter is operated in synchronism with the disc 15 to secure reversals in the current flow simultaneously with the exposures of the spots.

While throughout this specification considerable stress has been placed upon the use of certain kinds of molybdenite, so called, having certain newly-discovered optical properties, as the light-reactive substance for generating a pulsating electric current it is to be understood that other substances, for example, iron pyrites, stibnite, etc., may be substituted therefor to produce the desired results.

It is to be understood also that other forms or means for exposing alternately the loci of negative and positive electromotive force of an actinoreactive body to the light source may be substituted for those shown, involving the underlying principle of my invention for the thermal radio-dynamic generation of a pulsating unidirectional or an alternating electric current of the desired frequency, which frequency may be varied as conditions may dictate and, hence, that such modifications as are within the scope of my claims I consider within the spirit of my invention.

For matter of simplification, methods of varying the intensity and wave length of the light are not indicated since they are obvious, having been disclosed in the Patents 1,458,165 and 1,450,061 granted to myself respectively on June 12, 1923 and March 27, 1923.

I claim:

1. Means for generating electric currents or electromotive forces optically comprising a light reactive body having spots of maximum positive actinoelectromotive force or maximum negative thermal electromotive force or both, and optical means for selectively exposing said spots to secure photoelectric currents in either direction as desired.

2. Means for generating electric currents or electromotive forces optically, comprising a molybdenite light reactive body having actinoelectrically sensitive areas approximately .1 to 1 mm. in diameter separated from other areas of the same approximate size approximately .1 to 3 mm., means for impressing an electric current through said body, and optical means for selectively exposing said areas.

3. Means for generating electric currents or electromotive forces optically comprising a light reactive body or crystal, having spots which generate maximum positive actinoelectromotive forces or maximum negative actinoelectromotive forces or both, a light source, and means for selectively exposing said spots to the light stimulus in order to secure actinoelectrical currents in either direction through the crystal.

4. Means of the character described, comprising a light reactive body having spots of maximum positive or negative actinoelectromotive force or both arranged in spaced relation, a primary current source for said body, a source of light, and means for selectively exposing said positive and negative spots of said body.

5. Means of the character described, comprising a light reactive body having spots of maximum positive or negative actinoelectromotive force or both arranged in spaced relation, a primary current source for said body, a reversing switch therefor, a source of light, and means for exposing the spots of said body simultaneously with the reversal of said switch.

6. Means of the character described, comprising a light reactive body having spots of maximum positive or negative actinoelectromotive force or both coincidentally arranged, a source of primary current to supply current alternately in opposite directions to said body, a source of light, and means for exposing the spots of said body simultaneously with the reversals of the primary current.

7. Means for generating, controlling and amplifying electric currents or electromotive forces optically, comprising an electrical circuit, consisting of a light reactive body having spots generating maximum positive or maximum negative actinoelectromotive forces or both and closely coincident spots of photoelectrical sensitivity, a source of electrical energy, a light source, and means for selectively exposing said spots to the light stimulus in order to secure the maximum electric currents in either direction.

8. Means for generating, controlling and amplifying electric currents or electromotive forces optically, consisting of an electric circuit comprising a light reactive body, having closely coincident photoelectrically and actinoelectrically sensitive areas of positive polarity, approximately 0.1 to 1 mm in diameter, separated from other areas of the same approximate size but of negative polarity, a light source, and means for selectively exposing these areas to the light stimulus.

9. A method of operating a light reactive body in an electrical circuit, said body having loci of positive or negative actinoelectromotive force or both for generating a pulsating or an alternating current, which consists in optionally and intermittently projecting thermal radiation on to either one of said loci.

10. A method of operating a light reactive body in an electrical circuit, said body having loci of positive or negative actinoelectromotive force or both for generating a pulsating or an alternating current, which consists in optionally and intermittently projecting thermal radiation alternately onto both of said loci.

11. A method of operating a combination of light reactive bodies in an electric circuit whereby the flow of current in either direction may be varied, said bodies having loci of actinopositive or actinonegative polarity or both, which consists in optionally and intermittently projecting thermal radiation alternately onto the loci of maximum positive and maximum negative actinoelectromotive force.

12. A method of operating light reactive bodies in an electric circuit, said bodies having loci of positive or negative actinoelectromotive force or both, which consists in optionally and intermittently projecting thermal radiation alternately onto both of said loci, and varying the electric current by varying the intensity and the wave length of the rays of thermal radiation stimulus.

13. A method of operating light reactive bodies in an electric circuit, said bodies having loci of positive or negative electropositive and negative electromotive force or both, which consists in optionally and intermittently projecting thermal radiation alternately onto both of said loci, and impressing on said bodies an external electromotive force of proper polarity.

14. In combination with light reactive bodies an apparatus for generating and amplifying a pulsating unidirectional, or an alternating, actinoelectric current, means for intermittently projecting thermal radiation alternately onto both of the loci of positive and negative electromotive force of said light reactive bodies, means for simultaneously impressing thereon an external electromotive force of proper polarity, and means for varying the intensity and the wave length of the exciting radiation, the source of such thermal rays being at a point remote from the light reactive body, for the purpose of amplifying and minifying the electric current flowing through any electrical response device that may be interposed in the electric circuit.

15. A thermal radiodynamic device for generating a pulsating actinoelectric current comprising a light source, an electric circuit remote from such source, a light reactive body, which generates the electric current, interposed in said circuit adapted to receive the thermal radiation emitted by said source, means for exposing the light-reactive body intermittently to the source of radiation, means for modulating the intensity and the wave length of such source to vary the intensity and the polarity of the pulsating unidirectional or alternating actinoelectric current generated by the light reactive body in said circuit.

16. A thermal radiodynamic device for generating a pulsating unidirectional, or an alternating, actinoelectric current comprising a light reactive body, which generates the electric current, interposed in an electric circuit and adapted to receive thermal radiation emitted by a remote source, means for modulating the intensity and the wave length of the radiation emitted by said source, means for exposing the light reactive body intermittently to the source of radiation, and means for amplifying and minifying the actinoelectric current generated by the light reactive body, by simultaneously impressing upon the electric circuit an external primary electromotive force of proper polarity.

17. A thermal radiodynamic device for generating a pulsating unidirectional, or an alternating, actinoelectrical current comprising a light reactive receiver of molybdenite, which either in isolated loci within a single crystal, or by a suitable combination of crystals having singly loci of photonegative and photopositive reaction, generates a positive and a negative actinoelectromotive force when exposed to a source of thermal radiation, means for optionally and intermittently exposing alternately both of these photosensitive loci to said source of thermal radiation, means for modulating the actinoelectric current so generated by varying the intensity and the wave length of said source of exciting radiation, means for passing a primary electric current alternately in opposite directions through said light reactive body, and means for exposing the actinoelectrically sensitive spots of said body simultaneously with the reversal of the primary current for amplifying and minifying the actinoelectric current generated by the molybdenite light reactive receiver.

In testimony whereof I affix my signature.

WILLIAM W. COBLENTZ.